(12) United States Patent
Sakajiri et al.

(10) Patent No.: US 7,563,387 B2
(45) Date of Patent: Jul. 21, 2009

(54) HYDROPHILIC STIFF MAIN CHAIN TYPE LIQUID CRYSTALLINE COMPOSITION AND CHIRAL SENSOR UTILIZING THE SAME

(75) Inventors: Koichi Sakajiri, Aichi (JP); Eiji Yashima, Aichi (JP)

(73) Assignee: Japan Science and Technology Agency, Saitama (JP)

( * ) Notice: Subject to any disclaimer, the term of this patent is extended or adjusted under 35 U.S.C. 154(b) by 330 days.

(21) Appl. No.: 10/588,452

(22) PCT Filed: Jan. 31, 2005

(86) PCT No.: PCT/JP2005/001346

§ 371 (c)(1),
(2), (4) Date: Aug. 4, 2006

(87) PCT Pub. No.: WO2005/080500

PCT Pub. Date: Sep. 1, 2005

(65) Prior Publication Data

US 2007/0145329 A1    Jun. 28, 2007

(30) Foreign Application Priority Data

Feb. 23, 2004    (JP) .............................. 2004-045736

(51) Int. Cl.
C09K 19/00    (2006.01)
C09K 19/06    (2006.01)
C09K 19/52    (2006.01)

(52) U.S. Cl. .............................. 252/299.01; 252/299.6; 428/1.1; 430/20; 430/270.1

(58) Field of Classification Search ............ 252/299.01, 252/299.6; 428/1.1; 430/20, 270.1
See application file for complete search history.

(56) References Cited

U.S. PATENT DOCUMENTS

| | | | |
|---|---|---|---|
| 4,882,048 A | 11/1989 | Blaschke et al. | |
| 6,559,258 B2 | 5/2003 | Yashima et al. | |
| 6,833,430 B2 * | 12/2004 | Yashima et al. | 528/396 |
| 7,070,712 B2 * | 7/2006 | Tang et al. | 252/299.65 |
| 2002/0033474 A1 | 3/2002 | Tang et al. | |

FOREIGN PATENT DOCUMENTS

| | | |
|---|---|---|
| JP | 56-106907 A | 8/1981 |
| JP | 63-001446 A | 3/1989 |
| JP | 64-079230 A | 3/1989 |
| JP | 02-227425 A | 9/1990 |
| JP | 07-292037 A | 7/1995 |
| JP | 09-176243 A | 7/1997 |
| JP | 10-120731 A | 5/1998 |
| JP | 2001-164251 A | 6/2001 |
| JP | 2001-294625 A | 10/2001 |
| JP | 2001-294626 A | 10/2001 |
| JP | 2003-055410 A | 2/2003 |
| JP | 2003-292538 A | 10/2003 |
| WO | WO-01/79310 A1 | 10/2001 |

OTHER PUBLICATIONS

Katsuhiro Maeda et al., "Nonracemic Dopant-Mediated Hierarchial Amplification of Macromolecular Helicity in a Charged Polyacetylene Leading to a Cholesteric Liquid Crystal in Water," American Chemical Society, vol. 126, No. 50, pp. 16284-16285 (2004).

Mitsuo Albert Saito et al., "Synthesis and Macromolecular Helicity Induction of a Stereoregular Polyacetylene Bearing a Carboxy Group with Natural Amino Acids in Water," American Chemical Society, vol. 33, No. 13, pp. 4616-4618 (2000).

International Search Report.

Taiwanese Office Action dated Dec. 10, 2008, issued in corresponding Taiwanese Patent Application No. 94104586.

* cited by examiner

*Primary Examiner*—Geraldina Visconti
(74) *Attorney, Agent, or Firm*—Westerman, Hattori, Daniels & Adrian, LLP.

(57) ABSTRACT

A hydrophilic stiff main chain type liquid crystal comprising a water-soluble salt of a synthetic helical polymer having no asymmetric carbon atom as a main component of the main chain thereof, for example, a polyacetylene derivative having such constitution; and a chiral sensor utilizing a liquid crystal comprising a water-soluble salt of the above synthetic helical polymer, in particular, a water-soluble salt of the above synthetic helical polymer having no asymmetric carbon atom.

18 Claims, No Drawings

HYDROPHILIC STIFF MAIN CHAIN TYPE LIQUID CRYSTALLINE COMPOSITION AND CHIRAL SENSOR UTILIZING THE SAME

TECHNICAL FIELD

The present invention relates to a hydrophilic stiff main chain type liquid crystalline composition comprising a water-soluble salt of a synthetic helical polymer.

The invention also relates to a chiral sensor utilizing the above-mentioned hydrophilic stiff main chain type liquid crystalline composition, which comprises a water-soluble salt of a synthetic helical polymer.

BACKGROUND ART

As helical polymers, there are known: a biological polymer which has asymmetric carbon in its polymer main chain, typical examples of which include deoxyribonucleic acid, ribonucleic acid, proteins, polypeptide, and polysaccharides; a synthetic polymer which has no asymmetric carbon in its polymer main chain but has asymmetric carbon in its side chain thereby causing the main chain to express a helical structure, examples of which include polyisocyanate, polysilane, polyisocyanide, and polyacetylene; and a synthetic polymer having a stereoregularity controlled in such a manner that its polymer main chain forms a helical structure, an example of which is isotactic vinyl polymer.

In recent years, research projects wherein biomimesis is a key word have been actively made. In particular, attention has been drawn to a helical structure formed by biological molecule, and energetic research and development efforts has been focused in synthetic polymers wherein a helical structure as described above having a function is formed.

It is stated that a polymer of optically active triphenylmethyl methacrylate disclosed in, e.g., Patent Document 1 has a helical structure, thereby having a high optical rotation, so that this compound itself is useful as an optical resolving agent.

Patent Document 2 discloses an optically active poly(meth)acrylamide compound. It is stated that this compound is useful as an adsorbent for separating a racemic mixture into optical enantiomers thereof for its asymmetric structure based on an optically active side chain of the compound.

Furthermore, Patent Document 3 states that: a salt of a poly(carboxyarylacetylene derivative) has a unique nature that it exhibits circular dichroism in a long wavelength range in water in the presence of an optically active amino acid or optically active amino alcohol; and the salt is useful as a chiral sensor or an optical resolving agent.

Patent Document 4 discloses a liquid crystalline composition using an optically active polymer compound.

Furthermore, as basic research, there is an example regarding polyisocyanate or polysilane having asymmetric carbon in its side chain wherein stiff rigid rod property of a helical structure formed by polymer main chain is used to function as a mesogen for expressing liquid crystallinity, and thus a stiff main chain type liquid crystal is expressed in an organic solvent or thermotropic system (Patent Document 5).

It is important to supply liquid crystallinity to a material since the material is useful as an optically functional polymer material and can be used in many industrial fields. The supply of liquid crystallinity can easily be attained regarding side chain type liquid crystals having a liquid crystal moiety in their side chain, and thus, many research examples have been reported. Also, with regard to polyacetylene which is a typical example of an electroconductive polymer to which particular attention has been paid in recent years, a side chain type liquid crystal is reported (Patent Document 6).

Although nucleic acid or a polysaccharide expresses a liquid crystal structure in a dense aqueous solution, there is no case wherein a synthetic helical polymer as described above expresses a stiff main chain type liquid crystal in a aqueous solution thereof from the viewpoint of biomimetic material or in basic research.

Hitherto, commencing with Patent Document 3 and so on, various chiral sensors have been disclosed. However, in industrial fields, a material having a chiral discrimination with a still higher sensitivity has been desired.

Patent Document 1: JP-A-56-106907
Patent Document 2: JP-A-63-1446
Patent Document 3: JP-A-2001-294625
Patent Document 4: JP-A-1-79230
Patent Document 5: JP-A-2001-164251
Patent Document 6: JP-A-2-227425
Patent Document 7: JP-A-9-176243
Patent Document 8: JP-A-2001-294626
Patent Document 9: JP-A-2001-294626
Patent Document 10: JP-A-2003-55410
Patent Document 11: JP-A-2003-292538

DISCLOSURE OF THE INVENTION

An object of the present invention is to provide an unprecedented hydrophilic stiff main chain type liquid crystalline composition of a synthetic helical polymer. More specifically, an object of the invention is to provide a stiff main chain type liquid crystalline composition which is expressed in a dense aqueous solution of a water-soluble salt of a synthetic helical polymer, and a hydrophilic stiff main chain type liquid crystalline composition which can be used as a chiral sensor.

MEANS FOR SOLVING THE PROBLEMS

The present invention relates to a liquid crystalline composition containing a hydrophilic stiff main chain type liquid crystalline compound comprising a water-soluble salt of a synthetic helical polymer having no asymmetric carbon as a main constituent of its main chain.

The present invention also relates to use of a hydrophilic stiff main chain type liquid crystalline compound comprising a water-soluble salt of a synthetic helical polymer having no asymmetric carbon as a main constituent of its main chain as a liquid crystal material.

The present invention also relates to chiral sensor utilizing a hydrophilic stiff main chain type liquid crystalline compound comprising a water-soluble salt of a synthetic helical polymer or a liquid crystalline composition comprising the same, the use thereof, and a method for measuring chirality using the same.

The present invention further relates to use of a hydrophilic stiff main chain type liquid crystalline compound comprising a water-soluble salt of a synthetic helical polymer having no asymmetric carbon as a main constituent of its main chain as a liquid crystal material, or liquid crystalline composition comprising the same as a chiral sensor.

Specifically the present inventors have made eager research for solving the above-mentioned problems, so as to find out that: an acidic or basic substituent which easily becomes free in an aqueous solution is introduced into a side chain of a synthetic helical polymer; the polymer having the acidic substituent is treated with a basic aqueous solution or the polymer having the basic substituent is treated with an acidic aqueous solution so as to prepare a salt, whereby ionic interaction by which long-range order is easily generated in an aqueous solution is utilized to make a main chain helical structure formed by a salt of the synthetic helical polymer stable and stiff, so that a liquid crystal can be formed. In this way, the present invention has been accomplished.

In addition, the present inventors have also found out that form of said hydrophilic stiff main chain type liquid crystalline compound comprising a water-soluble salt of a synthetic helical polymer changes by addition of optically active compound, furthermore, the period of the helical structure of the cholesteric liquid crystal to be formed depends on the added amount of the optically active compound and the optical purity thereof. Thus, the present invention concerning novel and useful chiral sensor has also been accomplished.

The present invention produces remarkable advantageous effects in the point that it has been for the first time found out that: a dense aqueous solution of a salt of the synthetic helical polymer is a stiff main chain type liquid crystalline compound having a stiff helical molecule as a mesogen; and a hydrophilic composition containing the compound forms a liquid crystal.

The hydrophilic stiff main chain type liquid crystalline compound comprising a water-soluble salt of a synthetic helical polymer according to the present invention has chiral discrimination. The helical structure period of the cholesteric liquid crystal to be formed varies with a high sensitivity depending on the added amount of the optically active compound and the optical purity thereof. Thus, the use thereof as a chiral sensor can be greatly expected.

BEST MODE FOR CARRYING OUT THE INVENTION

Specific examples of a synthetic polymer used as the synthetic helical polymer having no asymmetric carbon as a main constituent of its main chain in the present invention may be a synthetic polymer such as polyisocyanate, polysilane, polyisocyanide, or polyacetylene, whereby a helical structure can be induced into its main chain by the introduction of asymmetric carbon into its side chain, etc; or a synthetic polymer such as isotactic vinyl polymer having a stereoregularity controlled in such a manner that its polymer main chain forms a helical structure.

Of these polymers, particularly preferred is polyacetylene since a helical structure is easily induced into its main chain and polyacetylene derivatives having various functions can be easily synthesized.

These helical polymers having no asymmetric carbon as a main constituent of their main chain are preferably a homopolymer which does not substantially contain any asymmetric carbon in its main chain in order to form a stable liquid crystal phase. Conversely, however, the introduction of asymmetric carbon into a molecular terminal or some other site may make the main chain helical molecule stable and stiff so as to form a liquid crystal easily. Therefore, a small amount of asymmetric carbon may be incorporated into the main chain insofar as main objects of the invention are not damaged or if the incorporation is effective. The helical polymer may be a random copolymer, a block polymer, or a graft copolymer, and a blend made of one or more of them is permissible.

The word "stiff" in the present invention means that a stable and fixed conformation can be kept. Examples of the chemical structure for keeping such stability include a structure wherein a relatively bulky substituent is introduced, thereby restricting free rotation of an element-element bond, for example, a carbon-carbon bond; and a structure wherein rotation is not easily caused around a bonding axis by action of a multiple bond such as a double bond.

The wording "stiff main chain type" in the present invention means that a stiff rod-like nature of a helical structure formed by a polymer main chain functions as a mesogen for expressing a liquid crystal.

The word "hydrophilic" means a system wherein water is substantially used as a solvent although a case where system contains an organic solvent is not excluded.

The above-mentioned compound containing in its main chain asymmetric carbon to be introduced into the molecular terminal or the like is not particularly limited, and may be a natural or non-natural optically active alcohol, carboxylic acid, amine, amino acid or the like. Although the ratio of the asymmetric carbon in the main chain is not specified without reservation since the ratio depends on the nature of the helical polymer, the ratio is usually 40% or less, preferably 10% or less, more preferably 5% or less.

The liquid crystalline composition of the present invention comprises a stiff main chain type liquid crystalline compound which functions as a mesogen for forming a liquid crystal by means of a stiff main chain helical molecule thereof, and the composition is different from any composition containing, as a component, a side chain type liquid crystal wherein a liquid crystal segment for forming a liquid crystal similar to existing low molecular weight liquid crystals is introduced into a polymer side chain, or a main chain type liquid crystal expressed in a polymer wherein mesogens for forming an existing low molecular weight liquid crystal and spacers such as flexible alkyl groups or alkoxy groups are alternately linked.

The liquid crystalline composition of the invention is a composition comprising a hydrophilic stiff main chain type liquid crystalline compound comprising a water-soluble salt of a synthetic helical polymer having no asymmetric carbon as a main constituent of its main chain and a carrier for liquid crystal. The carrier in the liquid crystalline composition of the present invention may be a solvent which is a liquid form at room temperature, and preferred examples thereof include such as distilled water and deionized water.

The water-soluble salt of the synthetic helical polymer regarding the present invention having no asymmetric carbon as a main constituent of its main chain has a functional group capable of forming a salt. The functional group is not particularly limited so long as the group can form a salt, and is preferably a group which contains a heteroatom. Examples thereof include carboxylic, sulfuric acid, amino, substituted amino, aminoalkyl, substituted aminoalkyl, pyridyl, phosphoric acid and phosphate groups, and an amino acid residue. Particularly preferred are amino, substituted amino, aminoalkyl, substituted aminoalkyl, pyridyl, phosphoric acid and phosphate groups, and an amino acid residue, which each contain a nitrogen or phosphorus atom as the above-mentioned heteroatom.

The substituted amino group may be any one of N-monosubstituted amino groups and N,N-di-substituted amino groups, and specific examples thereof include N-monoalkylamino groups such as N-methylamino, N-ethylamino, N-propylamino and N-isopropylamino groups; N,N-dialkylamino groups such as N,N-dimethylamino, N,N-diethylamino, N,N-dipropylamino and N,N-diisopropylamino groups; an N-ethyl-N-(β-hydroxyethyl)amino group; and an N,N-di(β-hydroxyethyl)amino group.

Examples of the aminoalkyl group include aminomethyl, aminoethyl, and aminopropyl groups.

The substituted aminoalkyl group is an alkyl group having a substituted amino group as described above, and examples of the alkyl group include methyl, ethyl, and propyl groups.

The amino acid residue may be any one of natural and non-natural amino acids. The residue is preferably introduced into the side chain through a peptide bond by use of the amino group or carboxyl group in the side chain from the viewpoint of the solubility in water or making the main chain helical structure stiff.

Examples of the phosphate group include monomethyl phosphate and monoethyl phosphate.

The chemical structure for forming the hydrophilic stiff main chain type liquid crystal of the present invention comprising salt of a synthetic helical polymer having no asymmetric carbon as a main constituent of its main chain needs to have a functional group capable of forming a salt in a polymer side chain. The functional group is not particularly limited if the group can form a salt, and the examples thereof include carboxyl, sulfuric acid, amino, substituted amino, aminoalkyl, substituted aminoalkyl, pyridyl, phosphoric acid and phosphate groups, and amino acid residues. Of the above-mentioned functional groups, preferred ones contain a heteroatom, for example such as sulfuric acid, amino, substituted amino, aminoalkyl, substituted aminoalkyl, pyridyl, phosphoric acid and phosphate groups, and amino acid residues since they each form a salt at ease. More preferred ones are amino, substituted amino, aminoalkyl, substituted aminoalkyl, pyridyl and phosphate groups, and amino acid residues, which each contain a nitrogen or phosphorus atom. In addition to the above-mentioned functional group, it is preferred that the polymer side chain has in any one of the α, β, and γ position thereof, one or more aliphatic substituents such as dimethyl, diethyl, dipropyl, isopropyl and 2-methylbutyl groups, or bulky substituents such as aromatic substituents such as phenyl and biphenyl groups in order to form a stiff helical structure at ease. These functional groups for forming a salt and the bulky substituents for making the helical structure stiff may each be introduced into the polymer side chain by any method. However, in order not to damage the water-solubility, it is preferred to introduce the above-described functional group for forming a salt to a terminal of a above-described bulky substituent for making the helical structure stiff. In other words, it is preferred to bond a bulky substituent as described above firstly to the main chain of the helical polymer and then introduce a functional group as described above to the tip of the bulky substituent. When the above-mentioned salt-forming functional group is an amino acid residue, it is preferred to use an amino group or carboxyl group in the side chain to introduce the residue through a peptide bond as described above.

The amount of the above-described salt-forming functional group and the bulk substituent introduced into the helical polymer may be adjusted insofar as the water-solubility or the stiffness of the main chain helical polymer are not damaged. It may be a homopolymer introduced into all monomer units of the polymer or a copolymer made from a monomer introduced and a monomer not introduced.

Among water-soluble salts of the synthetic helical polymer related to the present invention which has a functional group capable of forming a salt in its side chain, particularly preferred is a polyacetylene derivative having a side chain as described above since a stiff main chain helical structure is easily formed.

Such a polyacetylene derivative may be any polyacetylene derivative comprising an aliphatic or aromatic side chain which has a functional group and a substituent as described above. A more preferred example thereof is a polyarylacetylene derivative represented by the following formula [1]

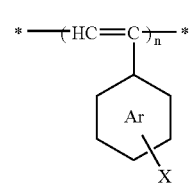

wherein n represents a polymerization degree, the ring Ar represents an aryl group having 5 to 18 carbon atoms or a heteroaryl group, and X represents a functional group capable of forming a salt.

The polymerization degree represented by n in the formula [1] is usually 5 or more, preferably 10 or more, or more preferably 20 or more.

Examples of the aryl group having 5 to 18 carbon atoms represented by the ring Ar include monocyclic, fused-cyclic or polycyclic aromatic hydrocarbon groups having 5 to 18 carbon atoms, such as phenyl, naphthyl, phenanthryl, and anthryl groups. Examples of the heteroaryl group include 5- to 8-membered monocyclic, cyclo-condensed or polycyclic heteroaryl groups which have 1 to 3 nitrogen atoms, oxygen atoms or sulfur atoms as heteroatoms, such as pyridyl, and quinolyl groups.

The functional group represented by X in the formula [1] which is capable of forming a salt is as stated in the description of the above-mentioned functional group capable of forming a salt in the side chain regarding the present invention.

Among these functional groups represented by X which are capable of forming a salt, a functional group containing a heteroatom is more preferred, and preferred examples of the heteroatom in the heteroatom-containing functional group include nitrogen and phosphorus atoms.

More preferred specific examples of the heteroatom-containing functional group include carboxyl, sulfuric acid, amino, substituted amino, aminoalkyl, substituted aminoalkyl, pyridyl, phosphoric acid and phosphate groups, and an amino acid residue (preferably, a residue introduced through a peptide bond by use of an amino or carboxyl group in the side chain). A salt of the polyarylacetylene derivative having any one of these functional groups has a high solubility and makes the helical structure stiff, and easily expresses a liquid crystal in a dense aqueous solution thereof.

The substituted amino, aminoalkyl, substituted aminoalkyl and phosphate groups, and the amino acid residue are as described above.

The substitution position for the functional group(s) may be any position in the aryl or heteroaryl group.

The aminoalkyl group which is a substituent in the benzene ring of the new poly(aminoalkyl-substituted phenylacetylene) compound of the present invention is represented by the following formula:

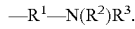

In the formula, $R^1$ represents a linear or branched alkylene group having 1 to 20 carbon atoms, preferably 1 to 10 carbon atoms, more preferably 1 to 5 carbon atoms, such as a methylene, ethylene, or propylene group. $R^2$ and $R^3$ each independently represent a hydrogen atom, a linear or branched alkyl group having 1 to 20 carbon atoms, preferably 1 to 10 carbon atoms, more preferably 1 to 5 carbon atoms, or a linear or branched alkylcarbonyl group having 2 to 21 carbon atoms, preferably 2 to 11 carbon atoms, more preferably 2 to 6 carbon atoms. Examples of this alkyl group include methyl, ethyl, n-propyl, and i-propyl groups. Examples of this alkylcarbonyl group include acyl groups derived from various carboxylic acids, for example, acetyl and propionyl groups derived from aliphatic carboxylic acids, and a glycyl group derived from an amino acid, preferably an α-amino acid.

The alkyl group in the alkyl group or the alkylcarbonyl group may further have one or more substituents, and examples of the substituents include halogen atoms, and nitro, amino, carboxyl, hydroxyl, guanidino, phenyl, hydroxyphenyl, and dihydroxyphenyl groups.

The amount of the above-mentioned functional group for forming a salt to be introduced into the helical polymer may be adjusted insofar as the water-solubility of the resulting polyarylacetylene derivative salt to be obtained or the stiffness of the main chain helical molecule are not damaged. It may be a homopolymer wherein the above-mentioned functional group is introduced into all monomer units of the polymer, or a copolymer made from a monomer into which the above-mentioned functional group is introduced and a monomer into which the above-mentioned functional group is not introduced.

It is sufficient that the polyarylacetylene derivative related to the present invention which has a functional group as described above in its side chain is a derivative wherein a functional group as described above is introduced into the ring Ar. Further, the derivative may have an additional substituent beside the functional group, and examples of this substituent include alkyl, alkoxy, and ester groups. However, in order to keep the water-solubility of the compound of the invention, it is not preferred to introduce such a hydrophobic substituent group as to hinder the water-solubility.

The polyarylacetylene derivative related to the invention may be a homopolymer made from only a single monomer, and a copolymer made from plural monomers insofar as the water-solubility of the resulting polyarylacetylene derivative salt and the stiffness of the main chain helical molecule are not damaged.

The synthetic helical polymer having no asymmetric carbon as a main constituent of its main chain that has in its side chain such as the above-mentioned amino, substituted amino, aminoalkyl, substituted aminoalkyl or pyridyl group, in other words, a basic side chain, should be treated with an acidic aqueous solution.

The acid used therein may be any acid that combines with the synthetic helical polymer having a basic side chain and used in the present invention as long as it forms a salt. Examples thereof include inorganic acids such as halide acids such as hydrochloric acid, hydrobromic acid and hydriodic acid, sulfuric acid, phosphoric acid, and nitric acid; and organic acids such as monohydric saturated aliphatic acids such as acetic acid and propionic acid, unsaturated aliphatic acids such as oleic acid, polyhydric aliphatic acids such as citric acid, linoleic acid, and linolenic acid, α-hydroxyacids such as lactic acid and mandelic acid, amino acids, and p-toluenesulfonic acid, however, the acid is not limited thereto. Similarly, the above-mentioned treatment method is applied to the polyacetylene derivative and the polyarylacetylene derivative represented by the formula [1]. Especially, it is preferred to treat the salt of the polyacetylene derivative treated with strong acid such as the halide acid which appears to have a high ion strength tends to make the helical structure stiff and stable in the molecular long axis direction over a long distance so as to cause a liquid crystal to be formed at ease, although the reason therefor is unclear.

The synthetic helical polymer having no asymmetric carbon as a main constituent of its main chain that has in its side chain such as the above-mentioned phosphate, carboxyl, phosphoric acid or sulfuric acid group, the amino acid residue, or some other similar group, in other words, an acidic side chain should be treated with an basic aqueous solution to make the polymer into a salt.

The base used therein may be any base that combines with the synthetic helical polymer having an acidic side chain and used in the present invention as long as it forms a salt. Examples thereof include alkali metal hydroxides such as sodium hydroxide, and potassium hydroxide, alkaline earth metal hydroxides such as magnesium hydroxide, and calcium hydroxide, amines such as diethylamine, triethylamine, ethanolamine, phenylglycinol, tetramethylammonium hydroxide, tetraethylammonium hydroxide, and benzyltrimethylammonium hydroxide, and ammonia (ammonium hydroxide), however, the base is not limited thereto.

Similarly, the above-mentioned treatment method is applied to the polyacetylene derivative and the polyarylacetylene derivative represented by the formula [1].

The neutralization degree of the above-mentioned basic side chain or acidic side chain with an acid or base is not particularly limited insofar as the water-solubility and the stiffness of the main chain helical structure are not damaged. In order to raise the recovery rate of a salt of the helical polymer in the treatment with the acid or base, it is advisable to attain complete neutralization or conduct the neutralization somewhat excessively as long as the decomposition of the helical polymer is not caused.

The water used as the solvent is preferably distilled water, which is deionized, however, it is not essential. It is allowable to add a small amount of a water-soluble organic solvent, inorganic salt or the like as long as the invention is not hindered.

The hydrophilic stiff main chain type liquid crystal of the present invention is expressed in an dense aqueous solution comprising a water-soluble salt of a synthetic helical polymer, which is related to the invention. Although the concentration of the dense aqueous solution which varies in accordance with the kind of the synthetic helical polymer or the kind of the salt thereof is not specified without reservation, the concentration is usually from 1 to 99%, preferably from 2 to 99%, more preferably from 5 to 95%. The concentration of polyacetylene derivative and the polyarylacetylene derivative represented by the formula [1] is also usually from 1 to 99%, preferably from 2 to 99%, more preferably from 5 to 95%.

Although the molecular weight of the synthetic helical polymer of the invention varies in accordance with the material monomer, the stiffness of the main chain of the synthetic helical polymer resulting from polymerization, and so on, and the molecular weight is not specified without reservation, it is usually 300 or more, preferably 1,000 or more, more preferably 3,000 or more. If the molecular weight is less than 300, the axial ratio of a stiff mesogen which is a requirement for forming a liquid crystal, that is, a helical molecule is low so that no liquid crystal can be formed. The molecular weight of the polyacetylene derivative and the polyarylacetylene derivative represented by the formula [1] is also 300 or more, preferably 1,000 or more, more preferably 3,000 or more.

With regard to the synthetic helical polymer wherein stereoregularity varies in accordance with the polymerizing method therefor such as isotactic vinyl polymer and the polyacetylene derivative, the synthetic helical polymer which is a polymer wherein stereoregularity is controlled and a regular, helical-period structure is formed expresses liquid crystallinity at ease. For example, in the polyacetylene derivative, the cis-transoid fraction in its main chain structure is preferably 60% or more, more preferably 80% or more, even more preferably 90% or more.

The hydrophilic stiff main chain type liquid crystal of the present invention comprising a water-soluble salt of a synthetic helical polymer can also be used as a chiral sensor.

The compound which can become a chiral sensor may be any salt of helical polymer if the salt is a water-soluble salt of a helical polymer which forms the stiff main chain type liquid crystal in a dense aqueous solution and may be a compound which interacts with an optically active compound so as to be changed in the form thereof or the like. The compound is preferably a water-soluble salt of a synthetic helical polymer which itself does not have an asymmetric carbon, and more preferably, from a practical viewpoint, one wherein a change that can be examined with an appropriate means is preferred.

With regard to the stiff main chain type liquid crystal of the present invention which is expressed in a dense aqueous solution of a helical polymer salt, in particular, the stiff main chain type liquid crystal comprising a water-soluble salt of a synthetic helical polymer which itself does not have an asymmetric carbon, the form thereof is changed in the presence of an optically active compound, and the change can be quantitatively analyzed at ease by its characteristic optical texture under microscope with crossed Nicols. In other words, the stiff main chain type liquid crystal which is expressed in an dense aqueous solution which comprises the helical polymer salt forms a cholesteric liquid crystal in the presence of an optically active compound, and its cholesteric helical structure period changes dependently on the amount of the added optically active compound or the optical purity thereof. This cholesteric helical structure period can easily be measured through microscopic observation thereof under crossed Nicols by doubling the interval between stripe texture which are its characteristic optical texture. This phenomenon appears to be due to the deflection of the winding direction of the main chain helical structure formed by the helical polymer salt. This means that the stiff main chain type liquid crystal which is expressed in an dense aqueous solution comprising the helical polymer salt is useful as a chiral sensor.

For detection thereof, it can also be examined from absorption of circular dichroism which originates from the helical polymer main chain. However, the absorption of the optically active compound itself may overlap therewith whereby quantitative analysis may be difficult. From such a viewpoint, the detecting method using a microscope has no obsticle. Thus, the method is highly useful.

However, among helical polymers, the polyacetylene derivative has an absorption of circular polarization originating from its main chain, in a long wavelength range near 350 nm; accordingly, the case that the absorption of the optically active compound itself seldom overlaps therewith. A chiral sensor using a liquid crystal comprising a salt of the polyacetylene derivative is more useful from the viewpoint that detecting device has variability to some extent.

The helical polymer salt which can be used as a chiral sensor may be any helical polymer salt if the salt is a helical polymer salt related to the present invention which forms a stiff main chain type liquid crystal in a dense aqueous solution thereof. Particularly preferred is a salt of a helical polymer which neither has asymmetric carbon in its main chain nor its side chains since the sensitivity as a chiral sensor is excellent. This appeals to be based on the following reason: the main chain helical structure which the salt of this helical polymer that neither has asymmetric carbon in its main chain nor its side chains primarily forms a racemic mixture having equal amounts of two helical structures of a right-handed helical structure and a left-handed helical structure; thus, under a condition that no optically active compound is present, a liquid crystal made from the racemic mixture alone is an optically inactive liquid crystal such as nematic liquid crystal, smectic liquid crystal, or columnar liquid crystal; therefore, the form thereof is remarkably changed even if the racemic mixture encounters a small amount of an optically active compound.

Hitherto, there have hardly been examples wherein chirality is detected in water or in a liquid crystal field. The present inventors disclosed that chirality is detected through circular dichroism in a dilute aqueous solution of a polyacetylene derivative in Patent Documents 3, and 7 to 11 as known examples. However, the sensitivity of chiral discrimination in a stiff main chain type liquid crystal field expressed in a dense aqueous solution comprising the present helical polymer salt is several times to several hundreds times superior to the known examples.

The optically active compound which can be discriminated by the chiral sensor of the present invention is not particularly limited, as long as optically active compound can effect the winding direction of the main chain helical structure formed by synthetic helical polymer salt and has minimal water solubility. For a salt of the polyacetylene derivative, preferred is an optically active compound having a carboxylic group, a hydroxyl group and an aromatic ring simultaneously, such as phenyllactic acid or mandelic acid since the compound easily effects the winding direction of the main chain helical structure formed by acetylene derivative salt, so as to exhibit an effect as a chiral sensor at ease.

Accordingly, the present invention provides the use of the liquid crystalline compound of the invention as a chiral sensor, and a method for measuring chirality by use thereof.

The chirality-measuring method of the present invention is a method wherein a test substance is added to a solution of the compound of the invention or to the liquid crystalline composition thereof and a change in the state of the compound of the invention is measured in the above-mentioned manner. For example, the method using a polarization microscope can be performed by adding a test substance to a water-soluble salt of the synthetic helical polymer of the invention having no asymmetric carbon as a main constituent of its main chain or a liquid crystalline composition comprising the same, and then detecting, identifying or quantitatively analyzing a change in stripe texture thereof.

As described above, on the basis of a simple and novel conception that a synthetic helical polymer is made into a salt, thereby using ion interaction effect which generates a long-range order to heighten the stiffness of a main chain helical structure formed by synthetic helical polymer salt, and prepare a liquid crystal in water, the inventors have found out a novel liquid crystalline compound of the invention.

The invention is very useful since it is possible to provide an unprecedented liquid crystal material or electric or optically functional polymer material with a function such as chiral discrimination, and because it is a hydrophilic system, it is preferred from the viewpoint of environment.

The present invention will be more specifically described by way of the following reference examples and examples, however, the invention is not limited thereto.

REFERENCE EXAMPLE

Synthesis of a Hydrochloric Acid Salt of poly(4-(N, N-diisopropylaminomethyl)-phenylacetylene)

(N,N-diisopropyl)-4-bromobenzylamine (75 mmol) and trimethylsilylacetylene (111 mmol) were reacted with each other in triethylamine (150 mL) in the presence of bis(triphenylphosphine)palladium dichloride (0.4 mmol), triphenylphosphine (1.2 mmol) and copper (I) iodide (2.9 mmol) at 90° C. for 41 hours. After the reaction, the product was separated by column chromatography (eluent: ethyl acetate/n-hexane =1/1), and then purified. The separated product was dried, and then treated in tetrahydrofuran in the presence of tetrabutylammonium fluoride, thereby yielding 4-(N,N-diisopropylaminomethyl)-phenylacetylene. The purification was conducted by distillation.

Boiling point: 54-56° C./0.13 mmHg, yield: 32%.

[RhCl(NBD)]2(NBD=norbornadiene) (22 μmol) was used as a catalyst to subject above obtained 4-(N,N-diisopropylaminomethyl)-phenylacetylene (2.2 mmol), to polymerization reaction in 4.4 mL of tetrahydrofuran at 30° C. for 15 hours. After the reaction, the reaction liquid was poured into an over excessive amount of 1 N hydrochloric acid-methanol. The liquid was stirred for 1 hour and subjected to centrifugal separation to recover a polymer (yield: 93%).

The number average molecular weight (340,000) and the molecular weight distribution (2.2) thereof were measured by size-excluding chromatography (SEC) (eluent: a solution of tartaric acid in water, the pH thereof being adjusted to 2.6) using polyethylene oxide/polyethylene glycol as a standard sample. The stereoregularity of the resultant polymer was substantially a 100% cis-transoid by $^1$H NMR spectra.

Other polyacetylene derivatives used in the following examples were also synthesized by the same method. All of the stereoregularities thereof were substantially 100% cis-transoids.

Example 1

Identification of a Liquid Crystal Phase Made of the Hydrochloric Acid Salt of poly(4-(N,N-diisopropylaminomethyl)-phenylacetylene)

The hydrochloric acid salt of poly(4-(N,N-diisopropylaminomethyl)-phenylacetylene) (5 mg) which has substituted aminoalkyl groups in its side chains and is represented by the following formula:

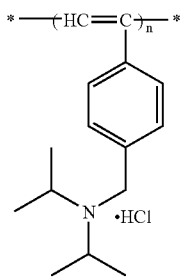

wherein n represents a polymerization degree, was dissolved in 20 μL of distilled water (20% by mass) in a sample bottle (2 mL in volume). The bottle was sealed up and allowed to stand still at room temperature (about 25° C.) for one day. The bottle was opened and the resultant was filled into a glass capillary. The capillary was again sealed up, and the resultant was used as a liquid-crystal-observing sample.

<Measuring Method>

The identification of the liquid crystal phase was determined by optical texture observed with a polarizer-fitted microscope ECLIPSE ME 600, manufactured by Nikon Corp., under a crossed Nicols. The measurement was made at room temperature (about 25° C.).

<Results>

The above-mentioned hydrochloric acid salt of the polyarylacetylene derivative which has substituted aminoalkyl groups in its side chains formed a nematic liquid crystal in a temperature range of 0 to 80° C. (microscopic observation).

Example 2

Identification of a Liquid Crystal Phase Made of a Citric Acid Salt of poly(4-(N,N-diisopropylaminomethyl)-phenylacetylene)

With regard to a citric acid salt of poly(4-(N,N-diisopropylaminomethyl)-phenylacetylene) represented by the following formula, a liquid-crystal-observing sample was prepared in the same way as in Example 1, and a liquid crystal phase thereof was identified in the same way as in Example 1:

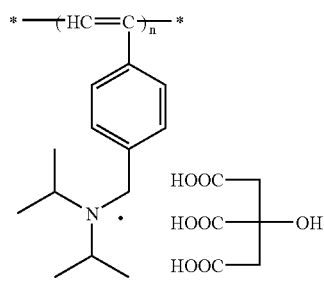

wherein n represents a polymerization degree.

<Results>

The above-mentioned citric acid salt of the polyarylacetylene derivative which has substituted aminoalkyl groups in its side chains formed a nematic liquid crystal in a temperature range of 0 to 80° C. (microscopic observation).

Example 3

Identification of a Liquid Crystal Phase Made of Sodium poly(4-(ethoxy-hydroxy-phosphoryl)-phenylacetylene)

A sodium salt of a polyarylacetylene derivative having phosphate groups in its side chains and is represented by the following formula (number average molecular weight: 19,000, molecular weight distribution: 3.5) was used as a sample to prepare a liquid-crystal-observing sample in the same way as in Example 1, and a liquid crystal phase thereof was identified in the same way as in Example 1:

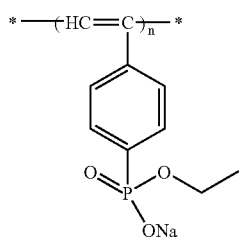

wherein n represents a polymerization degree.

<Results>

The above-mentioned sodium salt of the polyarylacetylene derivative which has substituted phosphate groups in its side chains formed a nematic liquid crystal in a temperature range of 0 to 80° C. (microscopic observation).

Example 4

Identification of a Liquid Crystal Phase Made of Sodium poly((R)-4-(2-tert-butoxycarbonylamino-4-carboxy-butyrylamino)-phenylacetylene)

A sodium salt of a polyarylacetylene derivative having glutamic acid residues which are amino acid residues in its side chains by peptide bonds and is represented by the following formula (number average molecular weight: 623,000, and molecular weight distribution: 2.2) was used as a sample to prepare a liquid-crystal-observing sample in the same way as in Example 1, and a liquid crystal phase thereof was identified in the same way as in Example 1:

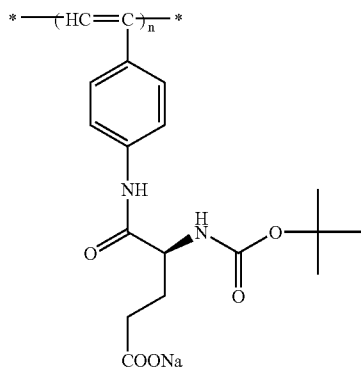

wherein n represents a polymerization degree.

<Results>

The above-mentioned sodium salt of a polyarylacetylene derivative having glutamic acid residues which are amino acid residues in its side chains by peptide bonds formed a cholesteric liquid crystal in a temperature range of 0 to 80° C. (microscopic observation). The period of the cholesteric helical structure was 9.6 μm.

The helical period of the cholesteric liquid crystal was obtained by doubling the interval between stripes of stripe texture observed under the microscope.

Example 5

Sodium (S)-phenyllacetate was added as an optically active compound to a aqueous solution of the hydrochloric acid salt of poly(4-(N,N-diisopropylaminomethyl)-phenylacetylene), which was used in Example 1. As a result, the resultant exhibited a cholesteric liquid crystal. The period of the cholesteric helical structure was measured by changing the added amount of the optically active compound. The results are shown in Table 1.

The helical period of the cholesteric liquid crystal was obtained by doubling the interval between stripes of stripe texture observed under the microscope.

TABLE 1

| Added amount (equivalent) for the polymer | Cholesteric helical structure period (μm) |
| --- | --- |
| 0.3 | 4.0 |
| 0.1 | 4.4 |
| 0.01 | 6.0 |
| 0.005 | 10.7 |
| 0.002 | 18.4 |
| 0.001 | 29.8 |
| 0.0005 | 49.5 |
| 0.0001 | 230.0 |

As is evident from Table 1, it is understood that the period of the cholesteric helical structure responds sensitively to the added amount of the optically active compound. This indicates that the amount of an optically active compound can be sensitively detected by using the cholesteric helical structure period as an index. Thus, it has been proved that the liquid crystal can be used as a chiral sensor.

Example 6

The ratio of sodium phenyllacetate (the (S)-former thereof being dominant) as an optically active compound to the hydrochloric acid salt of poly(4(N,N-diisopropylaminomethyl)-phenylacetylene) which was used in Example 1 was fixed to 0.1 equivalent. In this state, the period of the cholesteric helical structure was obtained in the same way as in Example 5 while the optical purity thereof was variously changed. The results are shown in table 2.

TABLE 2

| Optical purity (%) | Cholesteric helical structure period (μm) |
| --- | --- |
| 100 | 4.2 |
| 75 | 4.3 |
| 50 | 4.4 |
| 25 | 4.5 |
| 10 | 6.4 |
| 5 | 12.2 |
| 1 | 56.2 |

As is evident from Table 2, the period of the cholesteric helical structure depends on the optical purity of the optically active compound. This indicates that the optical purity of an optically active compound can be detected by using the cholesteric helical structure period as an index. Thus, it has been proved that the liquid crystal can be used as a chiral sensor.

Comparative Example 1

Poly(4-(ethoxy-hydroxy-phosphoryl)-phenylacetylene) which was used in Example 3 was not converted into any salt, and the crystal forming ability thereof was examined using distilled water as a solvent. The compound was poor in water solubility so that an insolubilized portion thereof remained in a small amount, but samples wherein the concentration thereof was in the range of 1 to 95% by mass were prepared.

The samples were observed with a microscope in a temperature range of 5 to 80° C. As a result, no liquid crystal was formed in the solubilized portion nor insolubilized portion. The solubilized portion was in a dark field under the microscope, and was an isotropic phase. It appears that the cause therefor is either of the following: the solubility was low that the volume density was low so as not to form any liquid crystal; or the compound was not a salt so that the stiffness of its main chain was low even in the solubilized portion whereby the helical molecule did not function as a mesogen.

Comparative Example 2

Poly(4-(ethoxy-hydroxy-phosphoryl)-phenylacetylene) which was used in Example 3 was not converted into any salt, and the crystal forming ability thereof in dimethylsulfoxide was examined. The solubility in dimethylsulfoxide was excellent, and thus samples wherein the concentration thereof was equal in the range of 1 to 95% by mass were prepared. The samples were observed with a microscope in a temperature range of 20 to 80° C. The samples were each in a dark field under the microscope, and were each an isotropic phase. The stiffness of the main chain of the polymer which was not any salt was low. This indicated that the helical molecule did not function as a mesogen.

Comparative Example 3

With regard to the sodium salt of poly(4-(ethoxy-hydroxy-phosphoryl)-phenylacetylene) which was used in Example 3, the crystal forming ability thereof in dimethylsulfoxide was examined. The solubility in dimethylsulfoxide was not good, but was better than the solubilities in other organic solvents. Accordingly, samples wherein concentration was in the range of 1 to 95% by mass containing a small amount of an insolubilized portion were prepared. The samples were observed with a microscope in a temperature range of 20 to 80° C. As a result, no liquid crystal was formed in the solubilized portion nor insolubilized portion. The solubilized portion was in a dark field under the microscope, and was an isotropic phase. It appears that the cause therefor was either of the following: the solubility was low so that the volume density was low so as not to form any liquid crystal; or the ion effect for heightening the stiffness of the main chain was low in the organic solvent, whereby the helical molecule did not function as a mesogen.

It is understood from the results of Examples 1 to 4 and Comparative Examples 1 to 3 that in order to form a stiff main chain type liquid crystal in a hydrophilic system, it is necessary to form the polymer into a salt thereof.

Comparative Example 4

Circular Dichroism Measurement of a Dilute Aqueous Solution of a Sample

In Example 5, instead of the 20% by mass aqueous solution of the hydrochloric acid salt of poly(4-(N,N-diisopropylaminomethyl)-phenylacetylene), a 0.1% by mass aqueous solution thereof was used, and a circular dichroism distribution meter, model J-820, manufactured by JASCO Corp. was used to examine the limit of chiral discrimination in the dilute solution by determining whether or not an absorption of the polyacetylene main chain near 360 nm was observed. As a result, the detectable limit based on the circular dichroism was 0.001 equivalent and the sensitivity was 1/10 or less.

Comparative Example 5

Circular Dichroism Measurement of a Dilute Aqueous Solution of a Sample

In Example 6, instead of the 20% by mass aqueous solution of the hydrochloric acid salt of poly(4-(N,N-diisopropylaminomethyl)-phenylacetylene), a 0.1% by mass aqueous solution thereof was used, and a circular dichroism distribution meter, model J-820, manufactured by JASCO Corp. was used to examine the limit of chiral discrimination in the dilute aqueous solution by determining whether or not an absorption of the polyacetylene main chain near 360 nm was observed. The detectable limit based on the circular dichroism was 5% and the sensitivity was 1/5 or less.

It is understood from the results of Examples 5 and 6 and Comparative Examples 4 and 5 that the chiral sensor of the invention using a stiff main chain type liquid crystal which is expressed in an dense aqueous solution comprising a water-soluble salt of a synthetic helical polymer has a higher sensitivity and is useful.

INDUSTRIAL APPLICABILITY

The invention provides an unprecedented hydrophilic stiff main chain type liquid crystal of a synthetic helical polymer and a chiral sensor utilizing said liquid crystal. Accordingly, the present invention is very useful since the invention makes it possible to provide an unprecedented liquid crystal material or an electronic or optically functional polymer material to which chiral discrimination or some other function is given in a hydrophilic system, which is preferred from the viewpoint of environment also.

The invention claimed is:

1. A liquid crystalline composition comprising a hydrophilic stiff main chain type liquid crystalline compound which is a water-soluble salt of a synthetic helical polymer that does not have an asymmetric carbon as a main constituent of its main chain.

2. The liquid crystalline composition according to claim 1, wherein the synthetic helical polymer having no asymmetric carbon as a main constituent of its main chain is a synthetic helical polymer having a functional group capable of forming a salt in its side chain.

3. The liquid crystalline composition according to claim 1, wherein the synthetic helical polymer having no asymmetric carbon as a main constituent of its main chain is a synthetic helical polymer having a functional group that is capable of forming a salt in its side chain and contains a heteroatom.

4. The liquid crystalline composition according to claim 1, wherein the synthetic helical polymer having no asymmetric carbon as a main constituent of its main chain is a polyacetylene derivative.

5. The liquid crystalline composition according to claim 4, wherein the polyacetylene derivative is a polyarylacetylene derivative represented by the following formula [1]:

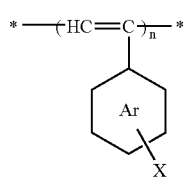

[1]

wherein n represents a polymerization degree, the ring Ar represents an aryl group having 5 to 18 carbon atoms or a heteroaryl group, and X represents the functional group capable of forming the salt.

6. The liquid crystalline composition according to claim 5, wherein X in the general formula [1] is the functional group that is capable of forming the salt and contains the heteroatom.

7. The liquid crystalline composition according to claim 6, wherein the heteroatom in the functional group that contains the heteroatom is a nitrogen atom or phosphorus atom.

8. The liquid crystalline composition according to claim 5, wherein the functional group that is represented by X in the formula [1] and is capable of forming the salt is an amino group, substituted amino group, aminoalkyl group, substituted aminoalkyl group, pyridyl group, amino acid residue, or phosphoric acid ester group.

9. The liquid crystalline composition according to claim 1, wherein the water-soluble salt of the synthetic helical polymer is a salt of an inorganic salt or organic salt.

10. The liquid crystalline composition according to claim 9, wherein the water-soluble salt of the synthetic helical polymer is an alkali metal salt, alkaline earth metal salt, amine salt or ammonium salt.

11. A chiral sensor comprising a hydrophilic stiff main chain type liquid crystalline compound comprising a water-soluble salt of a synthetic helical polymer having no asymmetric carbon as a main constituent of its main chain.

12. The chiral sensor according to claim 11, wherein the synthetic helical polymer is a synthetic helical polymer having no asymmetric carbon.

13. The chiral sensor according to claim 11, wherein the synthetic helical polymer having no asymmetric carbon as a main constituent of its main chain is a polyacetylene derivative.

14. The chiral sensor according to claim 13, wherein the polyacetylene derivative is a polyarylacetylene derivative represented by the following general formula [1]:

wherein n represents a polymerization degree, the ring Ar represents an aryl group having 5 to 18 carbon atoms or a heteroaryl group, and X represents the functional group capable of forming the salt.

15. The chiral sensor according to claim 14, comprising a water-soluble salt of the polyarylacetylene derivative which is represented by the formula [1] and does not have an asymmetric carbon.

16. Use of a hydrophilic stiff main chain type liquid crystalline compound comprising a water-soluble salt of a synthetic helical polymer that does not have an asymmetric carbon as a main constituent of its main chain as a chiral sensor.

17. A method for measuring the chirality of a test substance wherein the test substance is added in the presence of a hydrophilic stiff main chain type liquid crystalline compound which is a water-soluble salt of a synthetic helical polymer that does not have an asymmetric carbon as a main constituent of its main chain, thereby measuring stripe texture based on the hydrophilic stiff main chain type liquid crystalline compound.

18. The method according to claim 17, wherein the measurement is made with a polarization microscope.

* * * * *